United States Patent [19]

Tsukamoto et al.

[11] Patent Number: 5,516,376
[45] Date of Patent: May 14, 1996

[54] METHOD OF, AND APPARATUS FOR MANUFACTURING A GEAR WITH A CENTRAL THROUGH HOLE

[75] Inventors: Tetsuo Tsukamoto; Kiyoshi Ohkawachi, both of Hadano; Shinji Fushimi, Yokosuka; Shunzo Umegaki; Takashi Matsumoto, both of Yokohama, all of Japan

[73] Assignees: Nissan Motor Co., Ltd., Yokohama; Nittan Valve Co., Ltd., Tokyo, both of Japan

[21] Appl. No.: 248,144

[22] Filed: May 24, 1994

[30] Foreign Application Priority Data

May 26, 1993 [JP] Japan ................................. 5-124278

[51] Int. Cl.$^6$ ................................. C21D 9/32; B21K 1/42
[52] U.S. Cl. ..................... 148/586; 148/663; 29/893.34; 72/334; 72/355.6
[58] Field of Search ..................... 29/893.34; 72/334, 72/355.2, 355.6, 358; 148/586, 663

[56] References Cited

U.S. PATENT DOCUMENTS

| | | |
|---|---|---|
| 3,398,444 | 8/1968 | Nemy et al. |
| 3,832,763 | 9/1974 | Schober ........................... 29/893.34 |
| 4,939,829 | 7/1990 | Maki et al. ........................ 29/893.34 |
| 5,363,714 | 11/1994 | Hoguchi ............................ 29/893.34 |

FOREIGN PATENT DOCUMENTS

| | | | |
|---|---|---|---|
| 3701703 | 8/1988 | Germany. | |
| 61-129249 | 6/1986 | Japan ................................. 29/893.34 |
| 1003985 | 3/1983 | U.S.S.R. ............................ 72/355.2 |

Primary Examiner—P. W. Echols
Attorney, Agent, or Firm—Foley & Lardner

[57] ABSTRACT

A hardened surface layer is formed in the region of inner and outer surfaces of a hollow material having a central through hole, then the hollow material is hot-forged into a hollow gear-like forged body by a forging die having a first die element with a piercing punch entering into the central through hole of the hollow material from one side thereof and having a second die element with a piercing punch entering into the central through hole of the hollow material from another side thereof. The forging die forms teeth of the gear on the outer side of the hollow material while producing an annular flash in the central through hole of the hollow material between the piercing punches. A distance between the piercing punches in a closed condition of the forging die defines a thickness of the annular flash which is 0.3 mm or more and no greater than 1.3 times (130%) of a depth of the hardened surface layer. After that, the annular flash is removed from the forged body, and thermal refining is implemented to the forged body by quenching and tempering.

12 Claims, 4 Drawing Sheets

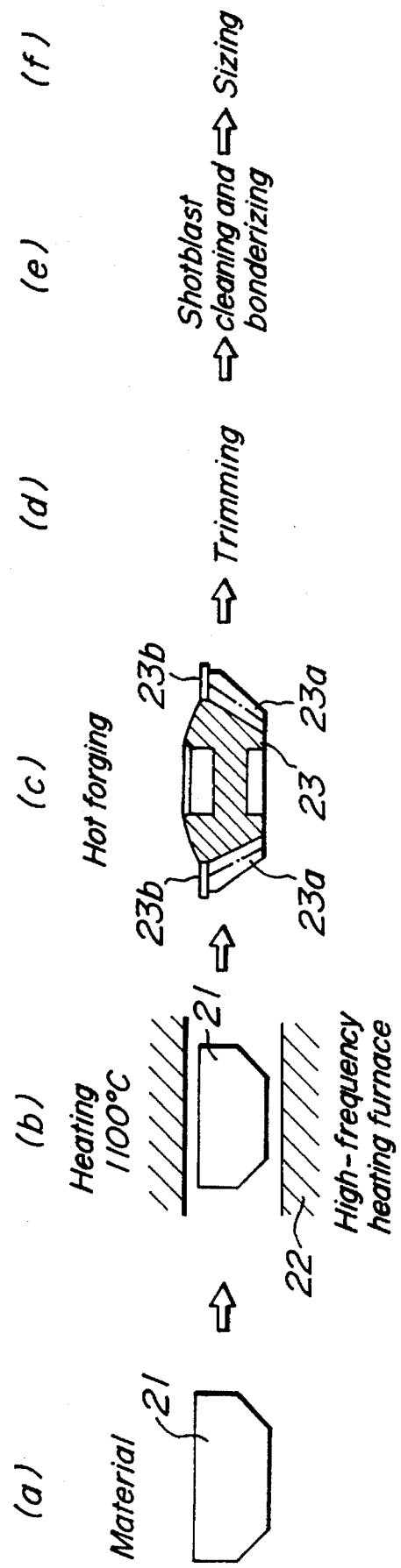

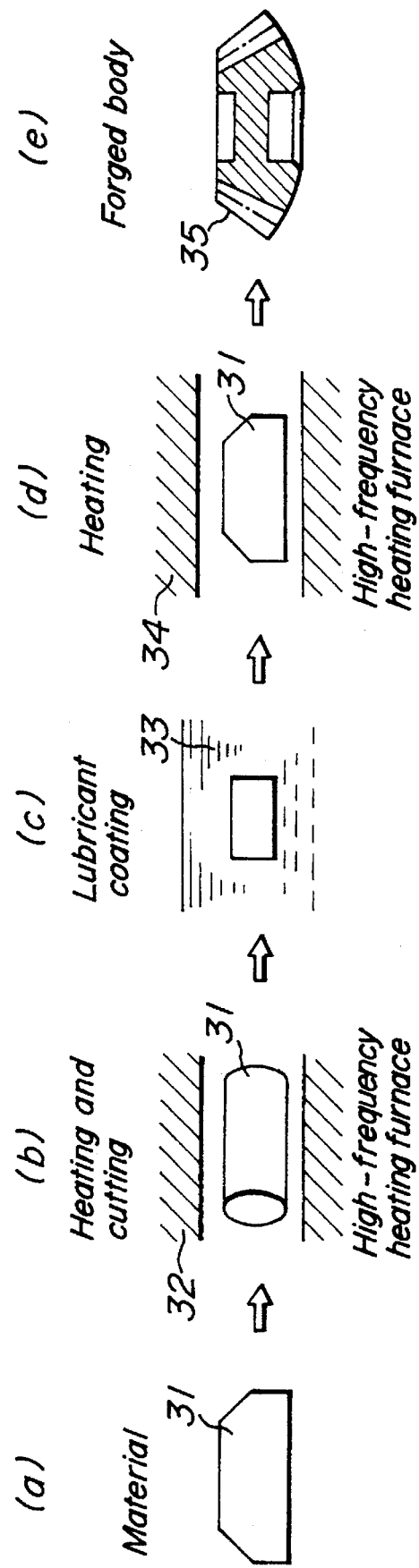

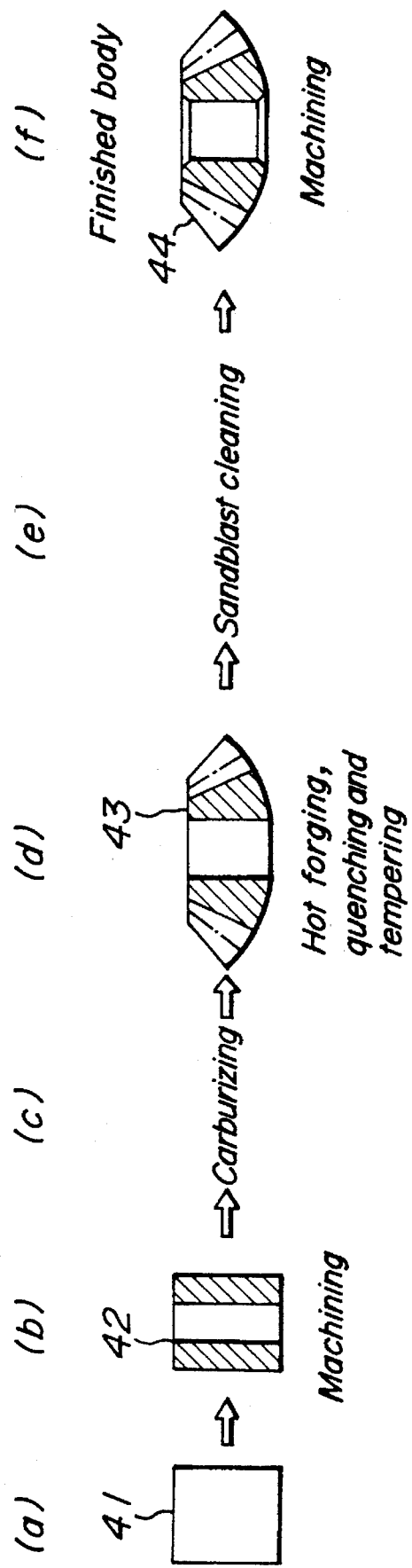

METHOD OF, AND APPARATUS FOR MANUFACTURING A GEAR WITH A CENTRAL THROUGH HOLE

BACKGROUND OF THE INVENTION

1. Field of the Invention

The present invention relates to a method of manufacturing a gear, which method is utilized for manufacturing a gear such as a spur gear, a helical gear and a bevel gear, etc. More particularly, the invention relates to a method of manufacturing a gear with a central through hole, which method is suitable for manufacturing a gear having a central through hole by means of improved hot die forging with high efficiency, high precision and elongated die life.

The present invention further relates to a forging die for manufacturing a gear from a hollow material having a central through hole, by means of the improved hot die forging.

2. Description of the Related Art

A method of manufacturing a gear such as a spur gear, a helical gear, and a bevel gear etc., by means of machining has been utilized conventionally in many cases, as described in, e.g., "Mechanical Engineers' Handbook" published by The Japan Society of Mechanical Engineering in May 15, 1988, pages B2-136 to B2-137, section 5.2.7 "Gear cutting and Gear shaving". Such a method employing machining, though, has a drawback that a manufacturing efficiency and a material yield in the method are both low. Therefore, in recent years, a method of manufacturing a gear by means of forging utilizing plastic deformation has been often implemented, as described in the aforementioned "Mechanical Engineers' Handbook" pages B2-100 to B2-106, section 4.2.4 "Forging".

FIG. 2 shows an exemplary process having successive steps (a) to (f) for manufacturing a bevel gear by means of hot forging and trimming. That is, with reference to the process, in first step (a) a solid material 21 for the gear is prepared, and in second step (b) the material 21 is heated to a temperature of, e.g., 1100° C. in a high-frequency heating furnace. In third step (c) the material 21 is deformed to a bevel gear-like forged body 23 by hot forging, and in fourth step (d) foil-like flashes 23b formed at ends of teeth 23a of the forged body 23 are removed by a trimming press. In fifth step (e) shotblast cleaning and bonderizing (zink phosphate coating) is implemented to the forged body 23, and finally in sixth step (f) sizing is implemented to the forged body 23 by a sizing press.

The process employing hot forging and trimming requires carrying out the trimming by a trimming press after the hot forging for removing the foil-like flashes 23b formed in the hot forging, so that the process has a disadvantage in that the process lowers manufacturing efficiency by increasing the number of working steps due to the additional trimming step. Thus, there has been a case wherein full enclosed die forging is employed for manufacturing a gear, as described in the aforementioned "Mechanical Engineers' Handbook" page B2-106, paragraph vii "Full enclosed die forging".

FIG. 3 shows an exemplary process having successive steps (a) to (e) for manufacturing a bevel gear by means of hot full-enclosed die forging, which process is described in "Komatsu Engineering Report, Vol. 32, No. 1" published by Komatsu Seisakusho Co., Ltd. in 1986, page 34. That is, with reference to the process in FIG. 3, in first step (a) a solid material 31 for the gear is prepared, and in second step (b) the material 31 is heated in a high-frequency heating furnace 32 and then cut to a proper length. In third step (c) a whole surface of the material 31 is coated with lubricant 33, and in fourth step (d) the material 31 is heated again in a high-frequency heating furnace 34. Finally in fifth step (e) the material 31 is deformed to a bevel gear-like forged body 35 by hot full enclosed die forging.

In both of the processes in FIG. 2 and FIG. 3, the material 21, 31 in solid shape is deformed to the bevel gear-like forged body 23, 35 by the forging, so that both of these processes have a disadvantage in that each process increases the number of working steps due to additional machining steps for forming a central through hole. Therefore, there has been a case wherein a hollow material is utilized for manufacturing a gear by forging.

FIG. 4 shows an exemplary process having successive steps (a) to (f) for manufacturing a bevel gear with a central through hole by means of hot full-enclosed die forging, which process is described in "Journal of The Iron and Steel Institute of Japan, Vol. 78, August 1992, No. 8" published by The Iron and Steel Institute of Japan in 1992, pages 110 to 116.

That is, with reference to the process in FIG. 4, in first step (a) a solid material 41 for the gear is prepared, and in second step (b) a hollow material 42 is formed from the solid material 41 by machining. In third step (c) a carburized layer is formed on inner and outer surfaces of the material 42 by carburizing, and in fourth step (d) bonderizing and graphitizing are implemented to the surfaces of the material 42 for lubricant coating, then the material 42 is heated to a temperature of 1000° C. and deformed to a hollow gear-like forged body 43 by full-enclosed die forging using a die having a mandrel for the hollow part, further in this step (d) quenching and tempering are implemented to the forged body 43. In fifth step (e) sandblast cleaning is implemented to the forged body 43 for removing scales, and finally in sixth step (f) a finished body (bevel gear) 44 is formed from the forged body 43 by machining.

In both of the hot forging and trimming process in FIG. 2 and the full-enclosed die forging process in FIG. 3, since the solid material 21, 31 is forged for forming only the gear teeth, after the forging, a central through hole is formed to the gear-like forged body 23, 35 by machining, then a back surface of the forged body 23, 35 is finished by machining, and after that, carburizing, quenching and tempering is implemented to the finished body. Consequently, each of the processes has a disadvantage in that each process is unfavorable for improving manufacturing efficiency and each process increases production cost because the process increases the number of working steps due to the machining steps and heat treating steps added to the hot forging step for the gear teeth. Further, each of the processes has a disadvantage in that each process suffers from a lowering of size accuracy as the central through hole is being formed.

On the other hand, in the hot full enclosed die forging process in FIG. 4, contacting time of the forging die to the heated material 42 becomes so long that the forging die is tempered by heat influence from the material 42. Therefore, the forging die having low hardness due to the tempering has a tendency to be unfavorably deformed, so that the die life is shortened, causing increasing production costs.

Thus, it has been proposed to manufacture a high precision gear with a central through hole, with high efficiency and without increasing production costs.

SUMMARY OF THE INVENTION

It is an object of the present invention to provide a method of manufacturing a gear with a central through hole, which method enables one to elongate a die life of a forging die and which method enables one to manufacture a high precision gear with a central through hole, with high efficiency and low production cost. Further, it is another object of the present invention to provide a forging die to implement the method in accordance with the invention.

The method of manufacturing a gear with a central through hole in accordance with the invention comprises a step wherein a hollow material having an outer surface and an inner peripheral surface defining a central through hole for the gear is prepared, a step wherein a hardened surface layer is formed in the region of the inner peripheral surface and outer surface of the hollow material, and a step wherein the hollow material having the hardened surface layer is hot-forged into a hollow gear-like forged body by a forging die having a first die element with a piercing punch entering into the central through hole of the hollow material from one side thereof and having a second die element with a piercing punch entering into the central through hole of the hollow material from another side thereof.

The forging die forms teeth of the gear on the outer side of the hollow material while producing an annular flash in the central through hole of the hollow material between the piercing punches, a distance between the piercing punches in a closed condition of the forging die defining a thickness of the annular flash which is 0.3 mm or more and no greater than 1.3 times (130%) of a depth of the hardened surface layer.

The method in accordance with the invention further comprises a step wherein the annular flash is removed from the hollow gear-like forged body after the hot forging, and a step wherein thermal refining is implemented to the hollow gear-like forged body by means of, e.g., quenching and tempering.

In the method in accordance with the invention, a hollow material having a central through hole is utilized for manufacturing a gear. With reference to this, the process for preparing the hollow material may be suitably selected and is not specifically limited, i.e., the hollow material may be formed from a solid material by machining such as drilling, or may be formed from a solid material by means of piercing with a cold former in cold condition, or may be obtained not from a solid material but from a material formed cylindrically like a pipe.

A material for the hollow material may be suitably selected and is not specifically limited, i.e., the hollow material may be made of a steel which is selected as a steel suitable for case hardening or a steel alloyed with appropriate elements, from a group consisting of SC steels (Carbon Steels for Machine Structural Use), SNC steels (Nickel Chromium Steels), SNCM steels (Nickel Chromium Molybdenum Steels), SCr steels (Chromium Steels), SCM steels (Chromium Molybdenum Steels), SMn steels (Manganese Steels for Machine Structural Use), SMnC steels (Manganese Chromium Steels for Machine Structural Use) and other steels prescribed in the Japanese Industrial Standard.

Further, in the method in accordance with the invention, surface hardening is implemented to the hollow material so as to form a hardened surface layer on each of an inner surface and an outer surface of the hollow material. With regard to this, the surface hardening may be suitably selected from carburizing, carbonitriding and nitriding, and is not specifically limited. Incidentally, e.g., in the case that carburizing is selected, a process for the carburizing may be suitably selected from regular carburizing, high temperature carburizing and vacuum carburizing.

Subsequent to the surface hardening, in the method in accordance with the invention, the hollow material having a central through hole is hot forged to a hollow gear-like forged body by a forging die having two die elements. During the time that the die is being closed in the hot forging, a piercing punch of one element of the forging die enters into the central through hole of the hollow material from one side of the hole while another piercing punch of another element of the forging die enters into the central through hole of the hollow material from another side of the hole. It is to be noted that the piercing punch should be interpreted as including a similar member such as a mandrel.

Previous to the above hot forging, surface lubricating may be preferably implemented to the hollow material in accordance with a requirement, which surface lubricating forms a lubricant coating consisting of at least one of, e.g., phosphate coating, molybdenum disulfide coating and graphite coating.

In the hot forging, the forging die forms teeth of the gear on an outer side of the hollow material while the forging die forms an annular flash in the central through hole of the hollow material between the piercing punches. During this forging, improved hot die forging is implemented, wherein a distance between the piercing punches defines a thickness of the annular flash which is 0.3 mm or more and no greater than 1.3 times (130%) of a depth of the hardened surface layer in a closed condition of the forging die.

The reason for the distance between the piercing punches defining the thickness of the annular flash being 0.3 mm or more and no greater than 1.3 times a depth of the hardened surface layer in a closed condition of the forging die is as follows.

That is, if the distance between the piercing punches and hence the thickness of the annular flash is less than 0.3 mm, the annular flash is cooled too fast and the piercing punches suffer larger resistance, causing larger deformation and/or more abrasion of the piercing punches, so that the die life is unfavorably shortened. On the other hand, if the distance between the piercing punches and hence the thickness of the annular flash is greater than 1.3·t mm, i.e., 1.3 times (130%) of a depth t mm of the hardened surface layer, the hardened surface layer is moved into the annular flash, causing a part having no hardened surface layer in the inner peripheral surface of the central through hole after the annular flash is removed by finishing, so that the forged gear may be unfavorably seized up with a carrying shaft during use, or the inner peripheral surface of the central through hole may be unfavorably partially abraded.

Next to the improved hot die forging, the annular flash and flashes formed on the teeth are removed from the forged body taken out from the die, and thermal refining is implemented to the forged body by means of, e.g., quenching and tempering, in which quenching and tempering the forged body may be heated to a quenching temperature in a proper atmosphere such as a high carbon potential atmosphere, an inert atmosphere or a non-oxidizing atmosphere, then cooled for quenching, and after that the forged body may be properly tempered.

After the thermal refining, sandblast or shotblast cleaning may be implemented to the forged body for removing scales, then, the forged body may be finished to a desired gear by machining.

Thus, owing to the method in accordance with the invention, increasing the number of working steps and the lowering of size accuracy as in the previous methods are avoided, and contacting time of the forging die to the heated material becomes shorter, and the resulting heat influence from the material to the forging die becomes less, so that the die life is elongated. Consequently, owing to the decreased working steps and elongated die life, the production cost can be reduced.

The forging die in accordance with the invention, for manufacturing a gear from a hollow material having an outer surface and an inner peripheral surface defining a central through hole, comprises one die element with a piercing punch entering into the central through hole of the hollow material from one side thereof, and another die element with a piercing punch entering into the central through hole of the hollow material from another side thereof, wherein the forging die is adapted to form teeth of the gear on the side of the outer surface of the hollow material while producing an annular flash in the central through hole of the hollow material between the piercing punches, a distance between the piercing punches defining a thickness of the annular flash which is 0.3 mm or more and no greater than 1.3 times (130%) of a depth of a hardened surface layer of the hollow material in a closed condition of the forging die.

By the forging die, the method in accordance with the invention can be implemented.

BRIEF DESCRIPTION OF THE DRAWINGS

The present invention will now be explained in more detail with reference to a preferred embodiment shown in the attached drawings, in which:

FIG. 2 shows a process for manufacturing a bevel gear by means of previous hot forging and trimming.

FIG. 3 shows a process for manufacturing a bevel gear by means of previous hot full-enclosed die forging.

FIG. 4 shows a process for manufacturing a bevel gear with a central through hole from a hollow material, by means of previous hot full-enclosed die forging.

DETAILED EXPLANATION OF THE PREFERRED EMBODIMENT

Figure 1:
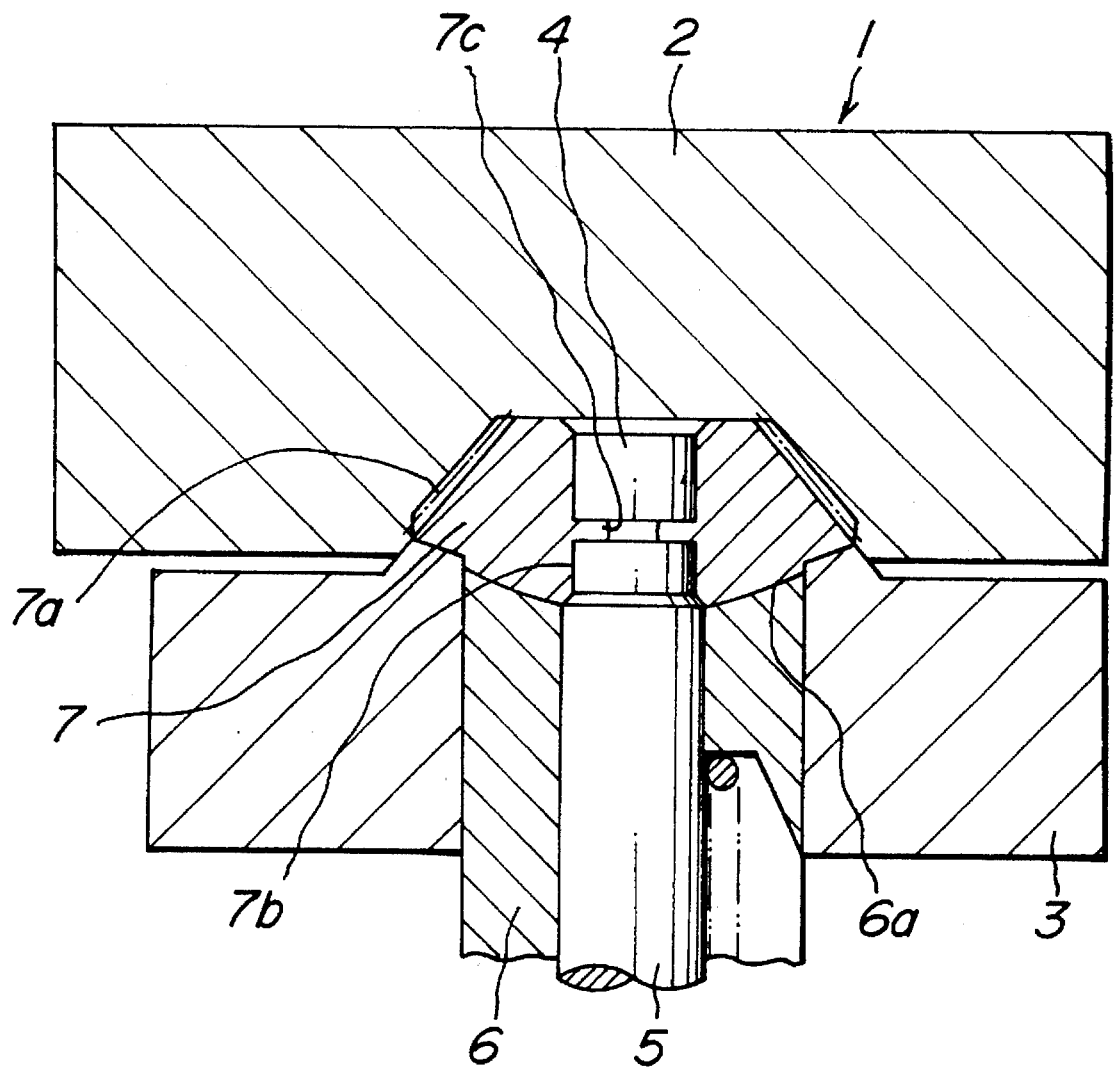
FIG. 1 shows a sectional view of a forging die utilized in an embodiment of the method in accordance with the invention for manufacturing a bevel gear with a central through hole.

In the embodiment of the method in accordance with the invention, a solid bar of SCM418H steel (one of Chromium Molybdenum Steels With Specified Hardenability Band, consisting of C: 0.17%, Si: 0.30%, Mn: 0.63%, Ni: 0.09%, Cr: 1.02%, Mo: 0.16%, Al: 0.019%, O: 0.0012%, N: 0.0155%, and Remainder: Fe and inevitable impurities, prescribed in the Japanese Industrial Standard) having a diameter of 28 mm is cut to a length of 31 mm to obtain a solid material for a gear, then the solid material is drilled to form a central through hole, thus a hollow material for a gear is prepared, which has an outer diameter of 28 mm, an inner diameter of 16 mm and a height of 31 mm.

Next, the hollow material is gas carburized at a temperature of 920° C. for 5 hours to obtain a carburized hollow material having a hardened surface layer of a depth (effective case depth) of 0.9 mm.

Subsequent to the carburizing, the hollow material is heated to a hot forging temperature of 1000° C.±10° C. by high-frequency heating in nitrogen gas to prevent oxidizing and decarburizing, then the hollow material is deformed to a gear-like forged body by improved hot die forging with a forging die 1 as shown in FIG. 1.

With reference to FIG. 1, the forging die 1 comprises an upper die element 2 and a lower die element 3. The upper die element 2 has an upper piercing punch 4 which is unitedly provided to the upper die element 2 and made as of fixed type. On the other hand, the lower die element 3 has a lower piercing punch 5 which is movable in directions parallel to an axis of the piercing punch 5, i.e., upward and downward in FIG. 1.

The forging die 1 further comprises a lower auxiliary die element 6 provided in the lower die element 3 and surrounding the lower piercing punch 5, which die element 6 has a spherical seat 6a at an upper end of the die element 6. In FIG. 1, the forging die 1 with die elements 2, 3 and 6 is in a closed condition, and in the forging die 1, teeth 7a are formed on the outer side of a hollow gear-like forged body 7, while an annular flash 7c is formed in a central through hole 7b of the hollow gear-like forged body 7 between the upper piercing punch 4 and the lower piercing punch 5.

In this embodiment of the forging die, materials of the die elements 2, 3 and 6 are all SKD62 steel (one of the alloy tool steels prescribed in the Japanese Industrial Standard). As producing the die elements 2, 3 and 6, a master model made of copper having teeth in the shape of a bevel gear is utilized for electrospark machining. After machining of the die elements 2, 3 and 6, quenching and tempering are implemented to the die elements 2, 3 and 6 to refine their hardness to HRC 60 (Rockwell Hardness with C scale).

When utilizing the forging die 1 with die elements 2, 3 and 6 for implementing the improved hot die forging to the hollow material of annular shape, the lower auxiliary die element 6 is elevated and the hollow material is mounted on the spherical seat 6a of the die element 6 while the piercing punch 5 is positioned at a height in which the distance between the piercing punch 5 and the upper piercing punch 4 becomes 0.9 mm as the forging die 1 is closed, i.e., the upper die element 2 is located at a lower stroke end, then the forging die 1 is closed by lowering the upper die element 2 while positioning the piercing punch 5 in the aforementioned height.

During closing of the forging die 1, the upper piercing punch 4 is inserted into the central through hole of the hollow material from an upper side of the hole, and, due to lowering of the lower auxiliary die element 6, the positioned lower piercing punch 5 is inserted into the central through hole from a lower side of the hole. Thus, the hollow gear-like forged body 7 having the annular flash 7c of a thickness of 0.9 mm formed between the piercing punches 4, 5 is obtained.

It is to be noted that the hollow gear-like forged body 7 is formed to have a finishing allowance in a range from 0.3 mm to 0.5 mm for later machining of a back surface of the forged body 7 and an inner surface of the central through hole of the forged body 7.

After taking out the forged body 7 from the die, the annular flash 7c and flashes formed on the teeth 7a are removed from the forged body 7, then thermal refining is implemented to the forged body 7 by quenching and tempering.

In the quenching, the forged body 7 is heated to a quenching temperature by passing the forged body 7 through a heating furnace of the tunnel type, an inner temperature of the heating furnace being controlled in a range from 820° C. to 840° C., and an atmosphere gas having a carbon potential in a range from 0.7% to 0.8% being filled inside of the heating furnace, so as to unify the quenching temperature and to prevent decarburizing and further to promote recrystallizing, then the forged body 7 is thrown into quenching oil of a temperature in a range from 80° C. to 100° C. to cool the forged body 7. It is to be noted that employment of inert gas for preventing decarburizing has also brought a good result.

In the tempering after the quenching, the forged body 7 is tempered at a temperature of 170° C. for 2 hours. Subsequently, sandblast cleaning is implemented to the forged body 7 for removing scales on it.

After the thermal refining, the forged body 7 is finished to a preferable gear by machining. In the machining, the forged body 7 is fixed to a jig using tooth surfaces of forged body 7 as base surfaces for positioning, then only the spherical back surface of the forged body 7 and an inner surface of the central through hole of the forged body 7 are finished by hard turning, i.e., high hardness material turning with a c-BN (cubic boron nitride) tool, wherein a cutting amount corresponds to the aforementioned finishing allowance. Thus, a desired bevel gear is obtained.

Such a bevel gear has a high size accuracy, and there is no part which is free from a carburized surface layer in the inner peripheral surface of the central through hole of the gear, so that a high precision bevel gear with high fatigue strength can be manufactured.

When the distance between upper piercing punch 4 and the lower piercing punch 5, i.e., the thickness of the annular flash 7c, was reduced to 0.27 mm for testing the forging condition, due to faster cooling speed of the annular flash 7c, the piercing punches 4, 5 suffered larger resistance on top of them, causing larger deformation and more abrasion of the piercing punches 4, 5, so that trouble with the piercing punches 4, 5 arose in only 150 shot of forging. On the contrary, when the distance between upper piercing punch 4 and the lower piercing punch 5, i.e., the thickness of the annular flash 7c, was set in 0.9 mm at accordance with the invention, because of the distance being proper, the piercing punches 4, 5 suffered no larger resistance on top of them, so that die life of the forging die 1 became so long that die costs could be reduced.

The foregoing description is by way of example only, and is not intended to limit the scope of the appended claims.

We claim:

1. A method of manufacturing a gear with a central through hole, said method comprising:
   A) a step wherein a hollow material having an outer surface and an inner peripheral surface defining a central through hole for the gear is prepared;
   B) a step wherein a hardened surface layer is formed in the region of said inner peripheral surface and said outer surface of said hollow material;
   C) a step wherein said hollow material having said hardened surface layer is hot-forged into a hollow gear-like forged body by a forging die having a first die element with a piercing punch entering into said central through hole of the hollow material from one side thereof and having a second die element with a piercing punch entering into said central through hole of the hollow material from another side thereof; wherein
      i) said forging die forms teeth of the gear on said outer side of said hollow material while producing an annular flash in said central through hole of the hollow material between said piercing punches; and
      ii) a distance between said piercing punches in a closed condition of said forging die defines a thickness of said annular flash which is 0.3 mm or more and no greater than 1.3 times (130%) of a depth of said hardened surface layer;
   D) a step wherein the annular flash is removed from the hollow gear-like forged body after the hot forging; and
   E) a step wherein thermal refining is implemented to the hollow gear-like forged body.

2. A method according to claim 1, wherein, in said step A), said hollow material is formed from a solid material by machining.

3. A method according to claim 1, wherein, in said step A), said hollow material is formed from a solid material by piercing with a cold former.

4. A method according to claim 1, wherein, in said step A), said hollow material is obtained from a material formed as a pipe.

5. A method according to claim 1, wherein, in said step A), said hollow material is made of a steel selected as a steel suitable for case hardening or a steel alloyed with appropriate elements.

6. A method according to claim 1, wherein, in said step A), said hollow material is made of a steel selected from a group consisting of carbon steels for machine structural use, nickel chromium steels, nickel chromium molybdenum steels, chromium steels, chromium molybdenum steels, manganese steels for machine structural use, and manganese chromium steels for machine structural use.

7. A method according to claim 1, wherein, in said step B), said surface hardening is performed by carburizing.

8. A method according to claim 1, wherein, in said step B), surface hardening is performed by carbonitriding.

9. A method according to claim 1, wherein, in said step B), said surface hardening is performed by nitriding.

10. A method according to claim 1, wherein, previous to said hot forging in said step C), surface lubricating is implemented to the hollow material, for forming a lubricant coating consisting of at least one of phosphate coating, molybdenum disulfide coating and graphite coating.

11. A method according to claim 1, wherein, in said step E), said thermal refining is performed by quenching and tempering.

12. A forging die for manufacturing a gear from a hollow material having an outer surface and an inner peripheral surface defining a central through hole, said forging die comprising:
   a first die element;
   a second die element cooperatively associated with said first die element to move from an open condition to a closed condition, at least one of said first and second die elements being adapted to form teeth of the gear on a side of the outer surface of the hollow material; and
   first and second means for entering into the central through hole of the hollow material from different sides thereof, for producing an annular flash in the central through hole of the hollow material between said first and second means, and, in a closed condition of said forging die, for producing a thickness of the annular flash which is 0.3 mm or more and no greater than 1.3 times (130%) of a depth of a hardened surface layer of the hollow material.

* * * * *